United States Patent
Lim et al.

(10) Patent No.: US 8,516,598 B2
(45) Date of Patent: Aug. 20, 2013

(54) METHOD AND APPARATUS FOR EDITING DIGITAL RIGHTS MANAGEMENT CONTENTS IN PORTABLE TERMINAL

(75) Inventors: Ce-Cil Lim, Suwon-si (KR); Eun-Hui Rhyu, Seoul (KR)

(73) Assignee: Samsung Electronics Co., Ltd (KR)

( * ) Notice: Subject to any disclaimer, the term of this patent is extended or adjusted under 35 U.S.C. 154(b) by 993 days.

(21) Appl. No.: 11/950,902

(22) Filed: Dec. 5, 2007

(65) Prior Publication Data
US 2008/0154972 A1 Jun. 26, 2008

(30) Foreign Application Priority Data
Dec. 7, 2006 (KR) ........................ 10-2006-0123868

(51) Int. Cl.
*G06F 21/00* (2013.01)
(52) U.S. Cl.
USPC ............................................. 726/26; 726/25
(58) Field of Classification Search
USPC ..................................................... 726/25–26
See application file for complete search history.

(56) References Cited

U.S. PATENT DOCUMENTS

| 7,318,236 | B2* | 1/2008 | DeMello et al. ................. 726/26 |
| 2003/0236886 | A1* | 12/2003 | Oren et al. ..................... 709/225 |
| 2005/0021556 | A1* | 1/2005 | Noguchi et al. .............. 707/102 |
| 2005/0132207 | A1* | 6/2005 | Mourad ......................... 713/189 |
| 2007/0168386 | A1 | 7/2007 | Choi et al. |

FOREIGN PATENT DOCUMENTS

| JP | 2006-209079 | 8/2006 |
| KR | 1020050056764 | 6/2005 |
| KR | 1020060032896 | 4/2006 |

\* cited by examiner

*Primary Examiner* — Philip Chea
*Assistant Examiner* — Ghazal Shehni
(74) *Attorney, Agent, or Firm* — The Farrell Law Firm, P.C.

(57) ABSTRACT

A method and an apparatus for editing Digital Rights Management (DRM) content in a portable terminal are provided. The method includes if an event for editing a DRM file occurs, allowing a user to set use purposes of the DRM content of the DRM file; and specifying the use purposes of the DRM content in an editable box of the DRM file. Thus, use purposes of DRM content of a multi-DRM file can be specified using an editable box of the multi-DRM file.

13 Claims, 5 Drawing Sheets

METHOD AND APPARATUS FOR EDITING DIGITAL RIGHTS MANAGEMENT CONTENTS IN PORTABLE TERMINAL

PRIORITY

This application claims priority under 35 U.S.C. §119(a) to a Korean Patent Application filed in the Korean Intellectual Property Office on Dec. 7, 2006 and assigned Serial No. 2006-123868, the contents of which are incorporated herein by reference.

BACKGROUND OF THE INVENTION

1. Field of the Invention

The present invention relates generally to a method and an apparatus for editing Digital Rights Management (DRM) contents in a portable terminal, and in particular, to a method and an apparatus for specifying use purposes of a plurality of DRM content using an editable box of a DRM file including the plurality of DRM content.

2. Description of the Related Art

Information generating and sharing has suddenly increased with the development of high-speed Internet service. Thus, debates over copyrightable information or content shared through the high-speed Internet service have arisen. As a result, development in Digital Rights Management (DRM) content technology for protecting copyrightable content has attracted increased attention. In general, DRM content technology has been developed to prevent illegal copying of copyrightable content in order to effectively protect the rights and profits of content providers and in order to support pay-per-use of the content as well as distribution and management thereof.

In conventional DRM technology, a DRM file typically includes DRM content. However, DRM technology has recently been expanded to examine the concept of a DRM file that includes a plurality of DRM content. In other words, this DRM technology involves a multi-DRM file which includes a plurality of content having different Multipurpose Internet Mail Extension (MIME) types, i.e., different media types, wherein the plurality of content include an image content, a voice content, and a video content, for example. As shown in FIG. 1, the multi-DRM file includes a DRM Content Format (DCF) file header, a plurality of DRM content having different MIME types, and an editable box 101.

The plurality of DRM content of the multi-DRM file may be used for various purposes. However, as of today, no method of using the plurality of DRM content for various purposes has been suggested. Moreover, although the multi-DRM file includes the editable box 101, no research has been conducted to determine how the editable box 101 is to be effectively used.

SUMMARY OF THE INVENTION

An aspect of the present invention is to substantially solve at least the above problems and/or disadvantages and to provide at least the advantages below. Accordingly, one aspect of the present invention is to provide a method and an apparatus for editing Digital Rights Management (DRM) content in a portable terminal.

Another aspect of the present invention is to provide a method and an apparatus for specifying use purposes of DRM content of a DRM file in a portable terminal.

A further aspect of the present invention is to provide a method and an apparatus for specifying use purposes of DRM content in an editable box of a DRM file in a portable terminal in order to use the use purposes of the DRM content for a theme package service.

The above aspects are achieved by providing a point-to-point emulation apparatus and method in a broadband wireless communication system.

According to one aspect of the present invention, there is provided a method of editing Digital Rights Management (DRM) contents in a portable terminal. The method includes if an event for editing a DRM file occurs, allowing a user to set use purposes of the DRM content of the DRM file; and specifying the use purposes of the DRM content in an editable box of the DRM file.

According to another aspect of the present invention, there is provided an apparatus for editing DRM contents in a portable terminal. The apparatus includes an input unit receiving use purposes of DRM content of a DRM file from a user if an event for editing the DRM file; and a DRM editor specifying the use purposes of the DRM contents in an editable box of the DRM file.

According to a further aspect of the present invention, there is provided a portable terminal for editing DRM content. The portable terminal includes an input unit receiving use purposes of DRM content of a DRM file from a user if an event for editing the DRM file; and a DRM editor specifying the use purposes of the DRM content in an editable box of the DRM file.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and an apparatus for specifying use purposes of a plurality of Digital Rights Management (DRM) content using an editable box of a DRM file including the plurality of DRM content in a portable terminal.

Here, the DRM file includes at least one DRM content and a box which can be edited by a user like Open Mobile Alliance (OMA) DRM v2.0.

Figure 1:
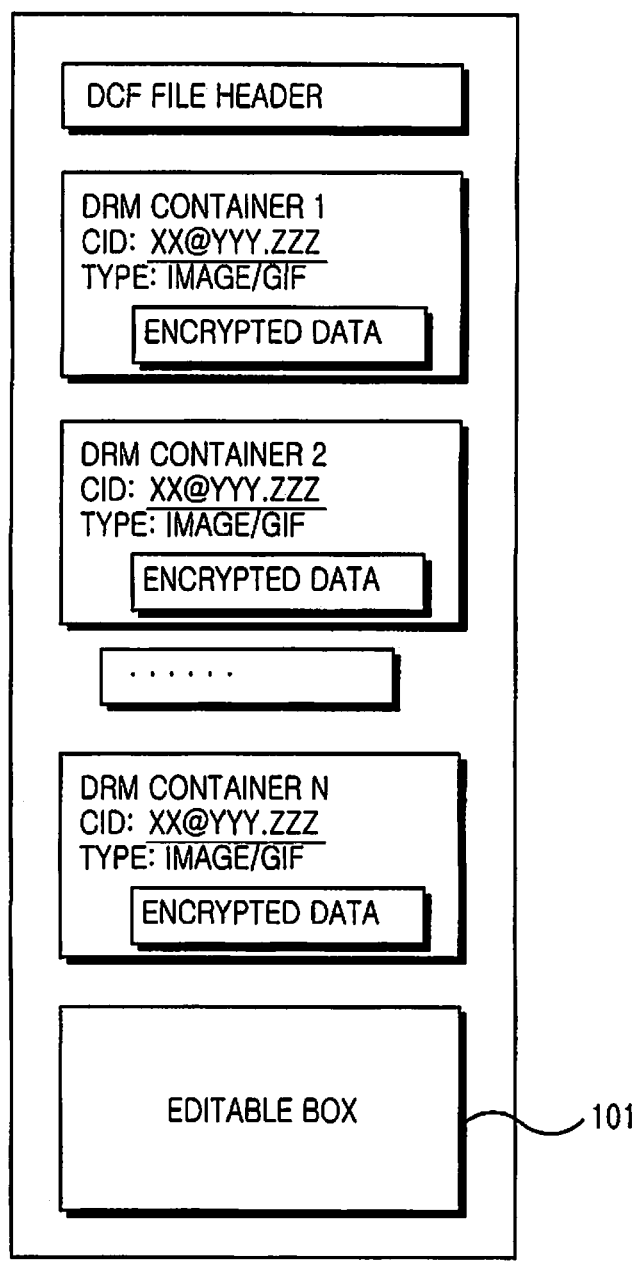
FIG. 1 illustrates a conventional format of a Digital Rights Management (DRM) file including a plurality of DRM content.
Figure 2:
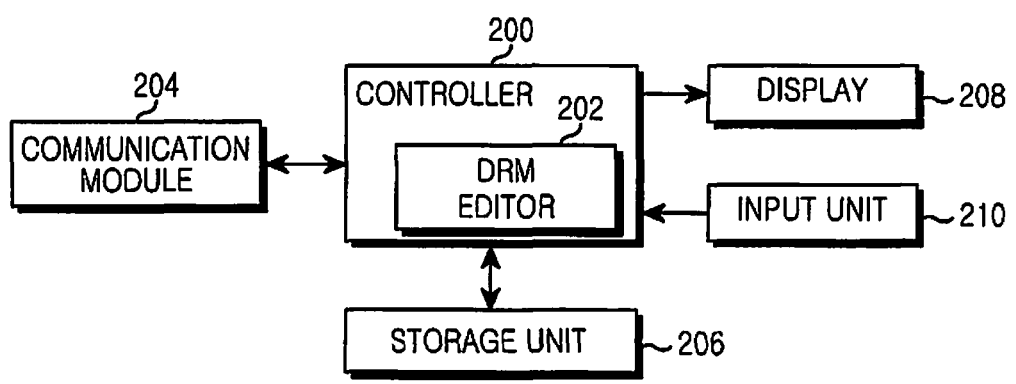
FIG. 2 is a block diagram of a portable terminal according to the present invention.

FIG. 2 is a block diagram of a portable terminal according to the present invention. In FIG. 2, the portable terminal includes a controller 200 having a DRM editor 202, a communication module 204, a storage unit 206, a display 208, and an input unit 210.

The controller 200 controls and processes the overall operation of the portable terminal. In particular, according to the present invention, if a DRM content editing event for setting use purposes of DRM content of a multi-DRM file occurs, the controller 200 directs the DRM editor 202 to perform a function of setting the use purposes of the DRM content of the multi-DRM file input from the storage unit 206 or the communication module 204.

Figure 4:
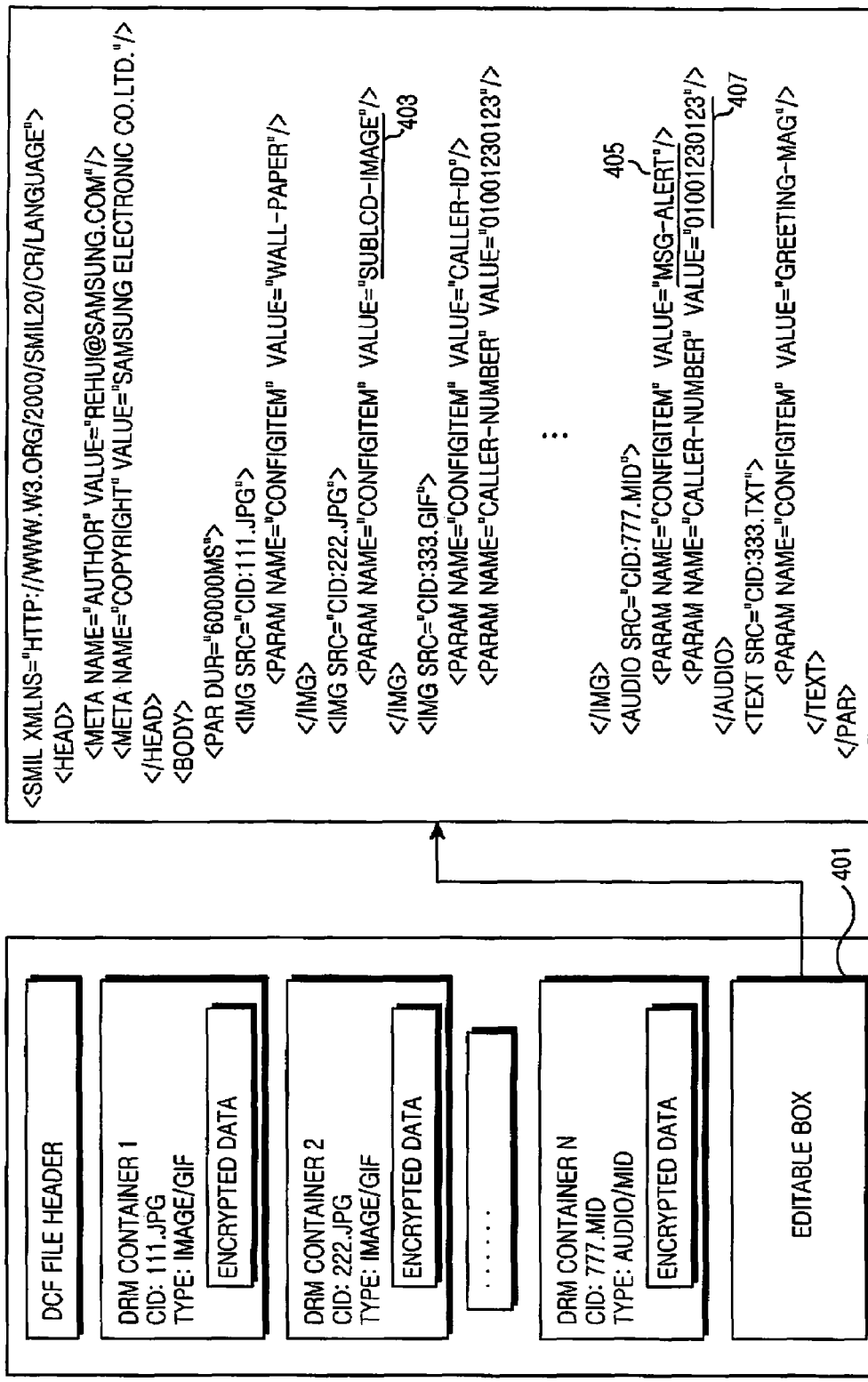
FIG. 4 illustrates a multi-DRM file including an editable box which specifies use purposes of DRM content in a portable terminal according to the present invention.

The DRM editor 202 analyzes the multi-DRM file input from the storage unit 206 or the communication module 204 to check content identifications (CIDs) and media types of the plurality of DRM contents of the multi-DRM file. Next, the DRM editor 202 outputs the CIDs and media types to the display 208 in order to control and process a function of displaying a content use purpose setup window on the display 208. If the use purposes of the DRM content of the multi-DRM file are input through the input unit 210, the DRM editor 202 specifies the use purposes of the DRM contents in an editable box of the multi DRM file using an eXtensible Markup Language (XML) and outputs the use purposes to the storage unit 206. For example, as shown in FIG. 4, the DRM editor 202 may specify a use purpose of a second content having a CID "222.jpb" and a media type "image/gif" as "subLCD-image" 403 in an editable box 401 of a multi DRM file. The DRM editor 202 may also specify a use purpose of a seventh content having a CID "777.jpg" and a media type "audio/mid" as "msg-alert" 405 and "01001230123" 407 in the editable box 401. Here, the use purposes of the DRM contents can be specified as described above to use an image "222.jpg," which is the second DRM content, as a background image of a sub-screen and an audio file "777.mid," which is the seventh DRM content, as a message arrival alert and simultaneously a bell sound of a caller number "01001230123".

The communication module 204 transmits and receives a Radio Frequency (RF) signal of data, which is input and output through an antenna (not shown). The communication module 204 may also receive DRM content from a DRM content providing server or another portable terminal and transmits a multi-DRM file of which use purpose has been specified to another portable terminal.

The storage unit 206 stores micro-codes of a program for processing and controlling operations of the controller 200, various types of reference data, and temporary data and storage data which is generated during the operation of the portable terminal. In particular, according to the present invention, the storage unit 206 stores a DRM file received from the communication module 204 and a DRM file including DRM content of which use purposes have been specified by the DRM editor 202.

The display 208 displays state information, limited numerical characters, a plurality of moving pictures, a plurality of still pictures, etc., which are generated during the operation of the portable terminal. In particular, according to the present invention, the display 208 receives the CIDs and media types of the DRM content from the DRM editor 202 and then displays a window for setting the use purposes of the DRM content of the multi-DRM file.

The input unit 210 includes a plurality of function keys to provide the controller 200 with data corresponding to a key pressed by a user. Moreover, the input unit 210 receives the use purposes of the DRM content of the multi-DRM file from the user and provides the DRM editor 202 of the controller 200 with the use purposes.

Figure 3:
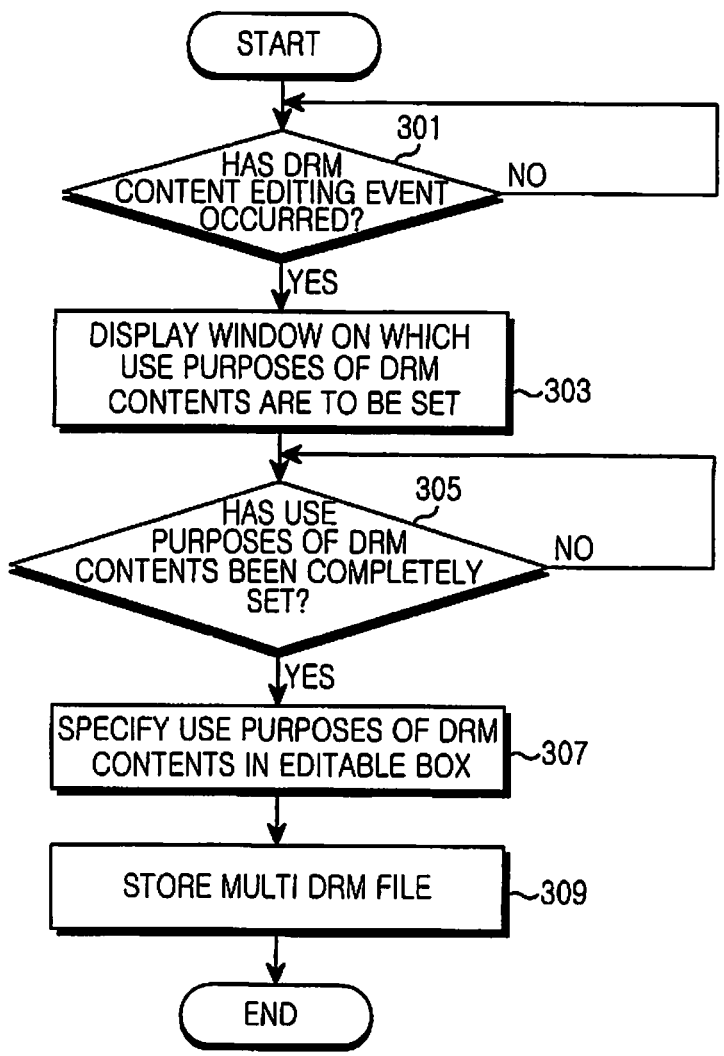
FIG. 3 is a flowchart of a process of specifying use purposes of DRM content of a multi-DRM file in a portable terminal according to the present invention.

FIG. 3 is a flowchart of a process of specifying use purposes of DRM content of a multi-DRM file in a portable terminal according to the present invention.

In FIG. 3, in step 301, the portable terminal determines whether a DRM content editing event for specifying use purposes of DRM contents of a multi-DRM file has occurred through a key manipulation of a user. If it is determined in step 301 that the DRM content editing event has occurred, the portable terminal then goes to step 303 to analyze the multi-DRM file selected by the key manipulation of the user, check CIDs and media types of the DRM content of the multi-DRM file, and display a window on which the use purposes of the DRM content are to be set.

In step 305, the portable terminal determines whether the use purposes of the DRM content have been completely set. If it is determined in step 305 that the use purposes of the DRM content have been completely set, the portable terminal then goes to step 307 to specify the use purposes of the DRM content in an editable box of the multi-DRM file. Here, the use purposes of the DRM content may be specified using an XML.

Figure 5:
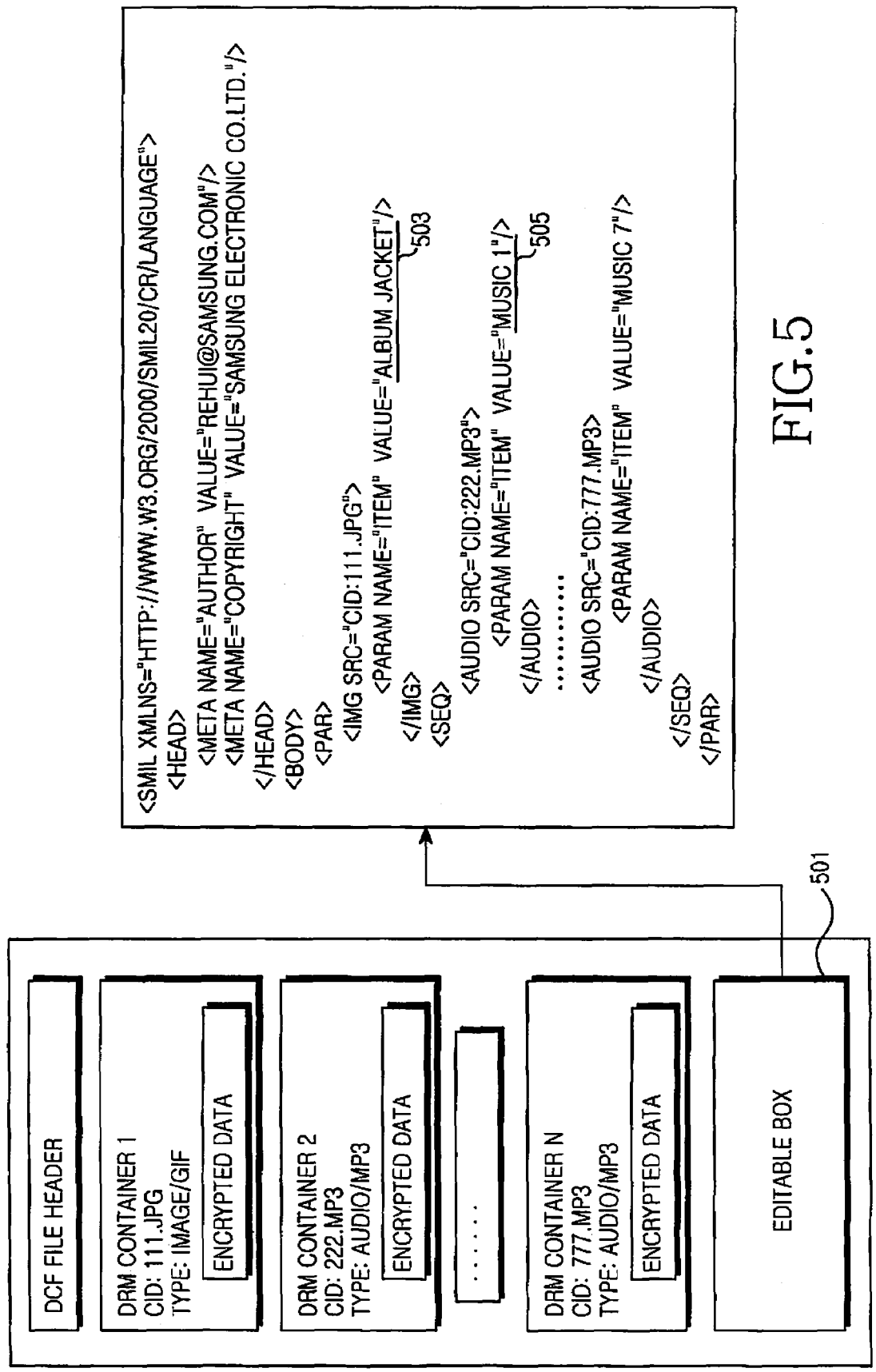
FIG. 5 illustrates a multi-DRM file including an editable box, which specifies use purposes of DRM content in a portable terminal according to the present invention.

For example, if the user desires to set an image content to be used as a background image, which is displayed during playing of music, in a multi-DRM file including the image content and a plurality of music contents and set an order of playing the plurality of music contents, as shown in FIG. 5, a use purpose of a first content having a CID "111.jpg" and a media type "image/gif" is specified as "album jacket" 503 in an editable box 501 of the multi DRM file, and a use purpose of a seventh content having a CID "222.mp3" and a media type "audio/mp3" is specified as "music 1" 505. Thus, the first content of the multi-DRM file may be displayed as a background image during playing of the music contents of the multi-DRM file, and a second content may be always first played during playing of the music contents.

In step 309, the portable terminal stores the multi-DRM file of which use purpose has been specified and then ends the process.

In accordance with the present invention as described above, use purposes of DRM content can be specified using an editable box of a multi-DRM file in a portable terminal. As a result, DRM content of a DRM file can be used for different purposes and for a package service such as, for example, a music album and a theme package.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of editing Digital Rights Management (DRM) content in a portable terminal, the method comprising:
   if an event for editing a multi-DRM file occurs, receiving use purposes for each DRM content included in the multi-DRM file; and
   specifying the use purposes for the each DRM content in an editable box of the multi-DRM file,
   wherein the multi-DRM file includes a plurality of DRM content of different media types including image content, voice content and video content.

2. The method of claim 1, further comprising:
   analyzing information of the each DRM content included in the multi-DRM file; and
   requesting to set the use purposes for the each DRM content by displaying the information of the each DRM content on a display.

3. The method of claim 2, wherein the information of the each DRM content comprises at least one of a content identification (CID) and a media type.

4. The method of claim 1, wherein the use purposes are specified using an eXtensible Markup Language (XML).

5. An apparatus for editing DRM content in a portable terminal, the apparatus comprising:
   an input unit for receiving use purposes for each DRM content included in a multi-DRM file from a user if an event for editing the multi-DRM file occurs; and
   a hardware processor for specifying the use purposes for each DRM content in an editable box of the multi-DRM file,
   wherein the multi-DRM file includes a plurality of DRM content of different media types including image content, voice content and video content.

6. The apparatus of claim 5, further comprising a display for displaying information of the each DRM content of the multi-DRM file, which is analyzed by the hardware processor, to request setting of the user purposes of the each DRM content, wherein the hardware processor analyzes the information of the each DRM content of the included in the multi-DRM file.

7. The apparatus of claim 6, wherein the information of each the DRM contents comprises at least one of a content identification (CID) and a media type.

8. The apparatus of claim 5, wherein the hardware processor specifies the use purposes of the DRM content in the editable box using an eXtensible Markup Language (XML).

9. A portable terminal for editing DRM contents, the portable terminal comprising:
   an input unit for receiving use purposes for each DRM content included in the multi-DRM file from a user if an event for editing the multi-DRM file occurs; and
   a hardware processor for specifying the use purposes for the each DRM content in an editable box of the multi-DRM file;
   wherein the multi-DRM file includes a plurality of DRM content of different media types including image content, voice content and video content.

10. The portable terminal of claim 9, further comprising a display for displaying information of the each DRM content included in the multi-DRM file, which is analyzed by the hardware processor, to request setting of the user purposes of the each DRM content, wherein the hardware processor analyzes the information of the each DRM content included in the multi-DRM file.

11. The portable terminal of claim 10, wherein the information of the each DRM content includes at least one of a content identification (CID) and a media type.

12. The portable terminal of claim 9, wherein the hardware processor specifies the use purposes of the DRM content in the editable box using an eXtensible Markup Language (XML).

13. A non-transitory computer-readable recording medium having recorded thereon a program for editing Digital Rights Management (DRM) content in a portable terminal, comprising:
   a first code segment, for receiving use purposes for each DRM content included in the multi-DRM file; and
   a second code segment, for specifying the use purposes for the each DRM content in an editable box of the multi-DRM file,
   wherein the multi-DRM file includes a plurality of DRM content of different media types including image content, voice content and video content.

* * * * *